United States Patent Office 3,320,046
Patented May 16, 1967

3,320,046
FORMULATION FOR CONDITIONING CUT FLOWERS AND PROCESS FOR EFFECTING SAME
Sanford M. Siegel, White Plains, N.Y., assignor to Union Carbide Corporation, a corporation of New York
No Drawing. Filed May 14, 1964, Ser. No. 367,561
20 Claims. (Cl. 71—2.4)

This invention relates to a novel formulation and a process for its use in the conditioning of cut flowers. In one aspect, this invention relates to a novel antiwilt formulation and a process for its use in conditioning leaves, branches, flowers and other portions of plants which have been severed from their natural growing environment.

Of particular concern to the nurseryman, shipper, wholesaler and florist is the perishable nature and relatively short life of cut flowers, leaves, branches and other similar floral decorations prior to their delivery to the ultimate purchaser. It is well known that when flowers are cut from the plants they lose their fresh appearance, wilt, and finally become unsuitable for their intended decorative purpose. The florist therefore prefers not to maintain a large supply of such a perishable commodity on hand at any one time, but orders from the wholesale florist according to business demands. Hence, any means which maintains and prolongs the fresh appearance, is of aid to the florist and permits a greater variety of flowers to be maintained in stock for extended periods of time.

Various methods are known and currently in practice which prolong the fresh appearance of cut flowers, both during shipping and while in the hands of the florist. For example, many flowers such as roses, gladiolas, iris and the like are cut and shipped while still substantially in the bud stage. Additionally, during transit many cut flowers, particularly roses, are packed in ice to delay bud opening and to insure their fresh condition upon arrival at the wholesaler or florist. Additionally, all major wholesalers and florists store cut flowers under refrigeration as a matter of course.

Other methods have also been proposed such as the use of various preservatives in the stem water to prolong the life of cut flowers. For some uses, especially floral arrangements, wherein it is impractical to immerse the stems in water, spraying with aqueous emulsions of wax have met with some degree of success in maintaining a freshly cut appearance. However, the use of preservatives, sprays, and waxes have left much to be desired from the standpoint of overall life of cut flowers and similar floral decorations.

Accordingly, it is an object of the present invention to provide a novel antiwilt formulation and a process for its use in conditioning cut flowers and other floral decorations. A further object of this invention is to provide a novel formulation and process whereby the fresh appearance of cut flowers is maintained for periods of time greater than heretofore possible. Another object is to provide a novel formulation which is inexpensive and easy to use for the preservation of cut flowers. A further object is to provide a novel process for the use of the aforesaid formulation. These and other objects will readily become apparent to those skilled in the art in the light of the teaching herein set forth.

In its broad aspect, the present invention relates to a novel antiwilt formulation and to a process for its use wherein cut flowers and other floral growth maintain their freshly cut appearance for greater periods of time than heretofore possible. In general, the antiwilt formulation of this invention is comprised of an antioxidant and at least one component selected from the group consisting of: (a) a mixture of certain inorganic compounds as hereinafter indicated and (b) one or more organic reducing agents. Although two of the components alone have been found to be effective as an antiwilt formulation, the combined use of all components provides the maximum effect.

The first component of the antiwilt formulation of this invention, also referred to as component A, is comprised of certain inorganic compounds in the concentrations hereinafter indicated. The compounds which have been discovered to be particularly useful are: (1) the water soluble inorganic salts or chelates which contain the following metal ions: copper ($Cu^{++}$), zinc ($Zn^{++}$), manganese ($Mn^{++}$), cobalt ($Co^{++}$), and nickel ($Ni^{++}$); and (2) the iodides and/or bromides of sodium potassium, or magnesium, and (3) boric acid or the borates of sodium, potassium, or magnesium. The copper or zinc compound, or the iodide, bromide, boric acid or borate salt are not effective alone and must be employed in conjunction with at least one, and preferably all the metal ions set forth above.

Although the particular water soluble salt or chelate containing the aforementioned metal ions is necessarily critical to the instant invention, it has been found that the optimum results are obtained when the copper, zinc and nickel are employed as their sulfates, the cobalt as the nitrate salt, and the manganese as the chloride. Other salts may equally as well be employed as long as they are non-toxic to the patricular plant and are compatible with the other ingredients of formulation. For example, the nitrate or chloride salts have also been found effective.

The second component, component B, of the antiwilt formulation of this invention is one or more organic reducing agents. In practice, it has been found that isoascorbic and/or ascorbic acid are particularly useful and comprise the main ingredient of component B. Isoascorbic acid is particularly preferred and can be employed as the sole constituent of component B, if so desired. However, for optimum results it has been found desirable to also include tryptophane and/or a sulfur-containing organic reducing agent, such as thiourea, in this component of the formulation. Either the dl- or l- form of tryptophane has been found suitable.

The antioxidant employed as the third or component C of the formulation of this invention can be one of several compounds, or mixtures thereof, which aid in the maintenance of the freshly cut appearance but which do not have an adverse affect on the flowers themselves. Antioxidants which have been found suitable for use in the formulation of the present invention include vinyl ethers, alkyl phenols, phenolic ethers, and the like. Particularly preferred are those antioxidants characterized by the presence of a vinyloxy group. The term "vinyloxy group" as used herein and in the appended claims characterizes a grouping of two carbon atoms bonded with a double bond, one of said carbon atoms being further bonded with a single bond to an adjacent oxygen atom. The group can also be described as a vinyl or vinylene radical attached to an oxygen atom.

The vinyl ethers which can be employed are those characterized by the presence of a vinyloxy group and include the alkyl vinyl ethers, substituted alkyl vinyl ethers, aryl vinyl ethers and the like.

The alkyl vinyl ethers contemplated herein include those containing up to 18 carbon atoms in the alkyl radical. Illustrative alkyl radicals are methyl, ethyl, n-propyl, isopropyl, n-butyl, sec-butyl, t-butyl, the amyls, the hexyls, the heptyls, the octyls, the dodecyls, the octadecyls, cyclopentyl, cyclohexyl, cycloheptyl, and the like.

The substituted alkyl vinyl ethers contemplated herein include the aralkyl vinyl ethers, the haloalkyl vinyl ethers, the haloaralkyl vinyl ethers, the alkoxyalkyl vinyl ethers, the alkthioalkyl vinyl ethers, the arylthioalkyl vinyl ethers, the dialkaminoalkoxyalkyl vinyl ethers, the aryloxyalkyl vinyl ethers, the halogenated aryloxyalkyl vinyl ethers, the hydroxyalkoxyalkyl vinyl ethers, and the like, containing up to eighteen carbon atoms in the substituted alkyl radical.

Illustrative aralkyl vinyl ethers are phenylbutyl vinyl ether, phenylpropyl vinyl ether, phenylmethyl vinyl ether, naphthylbutyl vinyl ether, naphthylpropyl vinyl ether, naphthylmethyl vinyl ether, anthrylbutyl vinyl ether, anthrylpropyl vinyl ether, anthrylmethyl vinyl ether, and the like.

Illustrative haloalkyl vinyl ethers are chloromethyl vinyl ether, dichloromethyl vinyl ether, bromomethyl vinyl ether, dibromomethyl vinyl ether, tribromomethyl vinyl ether, trichloromethyl vinyl ether, the chloropropyl vinyl ethers, the polychloropropyl vinyl ethers, the bromopropyl vinyl ethers, the polybromopropyl vinyl ethers, the polychloroethyl vinyl ethers, the polybromoethyl vinyl ethers, the polychlorobutyl vinyl ethers, and the like.

Illustrative haloaralkyl vinyl ethers are chlorophenylbutyl vinyl ether, the polychlorophenylbutyl vinyl ethers, the polybromophenylbutyl vinyl ethers, the polychlorophenylethyl vinyl ethers, the polychloronaphthylpropyl vinyl ethers, and the like.

Illustrative alkoxyalkyl vinyl ethers are methoxymethyl vinyl ether, ethoxymethyl vinyl ether, propoxymethyl vinyl ether, methoxyethyl vinyl ether, propoxyethyl vinyl ether, butoxyethyl vinyl ether, methoxypropyl vinyl ether, ethoxypropyl vinyl ether, propoxypropyl vinyl ether, butoxypropyl vinyl ether, butoxybutyl vinyl ether, and the like.

Illustrative alkthioalkyl vinyl ethers are 2-(S-methyl)-ethyl vinyl ether, 2-(S-ethyl)-ethyl vinyl ether, 2-(S-n-propyl)-ethyl vinyl ether, 2-(S-n-butyl)-ethyl vinyl ether, 2-(S-n-hexyl)ethyl vinyl ether, 2-(S-n-octyl)-ethyl vinyl ether, 2-(S-n-dodecyl)-ethyl vinyl ether, 2-(S-n-hexadecyl)-ethyl vinyl ether, 3-(S-n-octyl)-propyl vinyl ether, 4-(S-n-nonyl)-butyl vinyl ether, and the like . In addition, the alkthioalkyl radical of a vinyl ether can also contain up to 10 atoms as a substituted moiety thereof. Illustrative of these are 2-[S-(2'-cyanoethoxy)-ethyl]-ethyl vinyl ether, 2-[S-(2'-cyanopropoxy)-ethyl]-ethyl vinyl ether, and the like.

Illustrative arylthioalkyl vinyl ethers are 2-(S-phenyl)-ethyl vinyl ether, 3-(S-phenyl)-propyl vinyl ether, 2-(S-phenyl)-propyl vinyl ether, 4-(S-naphthyl)-butyl vinyl ether and the like.

Illustrative dialkaminoalkoxyalkyl vinyl ethers are 2 - [2' - (N,N - diethylamino)] - ethoxyethyl vinyl ether, 3-N,N-dimethylaminoethoxypropyl vinyl ether, 2-[2'-(N,N-dimethylamino)]propoxybutyl vinyl ether, and the like.

Illustrative aryloxyalkyl vinyl ethers are phenoxymethyl vinyl ether, phenoxyethyl vinyl ether, phenoxypropyl vinyl ether, phenoxybutyl vinyl ether, phenoxyhexyl vinyl ether, and the like. Also contemplated within this grouping are the alkoxy-substituted aryloxyalkyl vinyl ethers such as 2-(3,5-dimethoxyphenoxy)ethyl vinyl ether, 3-(3,5-diethoxyphenoxy)-propyl vinyl ether, and the like.

Illustrative haloalkaryl vinyl ethers are the chloromethylphenyl vinyl ethers, the bromomethyl phenyl vinyl ethers, the chloroethylphenyl vinyl ethers, the bromoethylphenyl vinyl ethers, the chlorobutylphenyl vinyl ethers, the chloropropylphenyl vinyl ethers, the chloromethyl naphthyl vinyl ethers, and the like.

As hereinbefore indicated a variety of alkyl phenols can also be employed as the antioxidant component of the antiwilt formulation. Suitable alkyl phenols include, among others o-cresol, m-cresol, p-cresol, 3,4-dimethyl phenyl and the like.

Preferred alkyl phenols are those wherein the alkyl group contains from 1 to 6 and more preferably 1 to 3 carbon atoms.

Also contemplated as the antioxidant component of the antiwilt formulation are the phenolic ethers. Illustrative compounds include the alkoxy phenols, e.g., 4-methoxy phenol, 2,6-dimethoxy phenol, and the like. The benzofurans are also illustrative of the phenolic ethers of this invention and include substituted benzofurans, as well as benzofuran-derived esters and salts thereof.

Illustrative benzofurans are the 5-hydroxy benzofurans such as 2-ethyl - 3 - carbethoxy - 5 - hydroxy - benzofuran, 2 - methyl - 3 - carbethoxy - 5 - hydroxy - benzofuran, 2 - n - propyl - 3 - carbethoxy - 5 hydroxy - benzofuran, 4,6,7-trimethyl-5-hydroxy-benzofuran, and the like; the chlorinated 5-hydroxy benzofurans such as 2-methyl-3-carbethoxy-4-chloro-5-hydroxy-benzofuran, 2-methyl - 3-carbethoxy-4,6-dichloro-5-hydroxy-benzofuran, 2-ethyl-3-carbethoxy-4-chloro-5-hydroxy-benzofuran, and the like; the brominated 5-hydroxy benzofurans such as 2-methyl-3-carbethoxy-4,6-dibromo-5-hydroxy-benzofuran, 2 - n-propyl - 3 - carbethoxy - 4 - bromo - 5 - hydroxy - benzofuran, 2 - n - propyl - 3 - carbethoxy - 6 - bromo - 5 - hydroxy-benzofuran, and the like; the salts of benzofuran-derived esters such as sodium salt of 2-methyl-3-carboxy-5-hydroxy-benzofuran ethyl ester, potassium salt of 2-ethyl-3-carboxy-5-hydroxy-benzofuran butyl ester, sodium salt of 2-n-propyl-3-carboxy-5-hydroxy-benzofuran ethyl ester, and the like.

In a preferred embodiment it has been found that the concentration of each of the aforesaid ingredients of the novel antiwilt formulation should fall within certain limits in order to condition cut flowers for the optimum period of time. For component A, the upper limit of the inorganic compounds is determined by the toxicity of the metal to the particular plant. In the majority of cases it has been found that the upper limit of tolerance for cut flowers contained in an aqueous media is 300 parts of the metal ion per million parts of water. Moreover, at least about 5 parts per million of the metal ion is necessary to obtain a noticeable effect on the life of cut flowers. Hence, a range of from about 5 to about 300 parts per million is preferred.

The main ingredient of component B, that is the isoascorbic acid, is preferably employed in an amount to give from about 10 to about 200 parts per million of the isoascorbic acid in the aqueous solution into which the cut flowers are placed, and tryptophane, when employed, is preferably present in the aqueous media in an amount up to about 50 parts per million. The thiourea or other sulfur containing-reducing agent, is utilized in a concentration of from about 5 to about 100 parts per million in the final aqueous solution.

The final component of the mixture, the antioxidant when used, is preferably employed in the final aqueous solution in an amount of from about 10 to 250 parts per million. Concentrations above and below the aforesaid ranges may also be employed but are less preferred.

In practice, and for economic considerations, the formulations of the instant invention will largely be prepared and stored as aqueous concentrates, as a powder, or as tablets, capsules, or the like. Merely diluting the concentrate or dissolving the solid formulation with water provides a ready media into which the stems of freshly cut flowers or other decorative plants can be placed.

When employed as either aqueous concentrates or solids, the amounts of the ingredients will of course be greatly increased. Thus, for example, a typical concentrate aqueous formulation which can be employed in the practice of this invention is illustrated below:

*Formulation A (salt solution) 10-fold aqueous concentrate*

Salt: Concentration (p.p.m.)
- $CuSO_4 \cdot 5H_2O$ _____ 500
- $ZnSO_4$ _____ 500
- $H_3BO_3$ _____ 500
- $MnCl_2 \cdot 4H_2O$ _____ 3000
- $Co(NO_3)_2 \cdot 6H_2O$ _____ 500
- KI _____ 200
- KBr _____ 200
- $NiSO_4 \cdot 6H_2O$ _____ 500

*Formulation B (Organic reducing solution) 10-fold concentrate*

Compound: Concentration (p.p.m.)
- dl-Tryptophane _____ 250
- Thiourea _____ 500
- Isoascorbic acid _____ 1000

*Formulation C (antioxidant solution) 10-fold concentrate*

Antioxidant: Concentration (p.p.m.)
- Vinyl 2-chloroethyl ether _____ 100–1000

Components A, B, and C are all compatible and may be combined, in such combinations, 300 cubic centimeters may be used in 1 liter of water, or 9 fluid ounces in 1 quart. For convenience, the volumes of combined components A+B+C may be reduced 3-fold, or all ingredients listed may be weighed into 1 liter of water to give a 30-fold concentrate.

In addition it may be desirable for ease of handling, to prepare the antiwilt formulation in a dry, solid form. Thus, a typical solid formulation which can be employed in the practice of this invention is illustrated below:

| Ingredient: | Weight in milligrams |
|---|---|
| $CuSO_4 \cdot 5H_2O$ | 50 |
| $ZnSO_4$ | 50 |
| $H_3BO_3$ | 50 |
| $MnCl_2 \cdot 4H_2O$ | 300 |
| $NiSO_4 \cdot 6H_2O$ | 50 |
| $Co(NO_3)_2 \cdot 6H_2O$ | 50 |
| KI | 20 |
| KBr | 20 |
| dl-Tryptophane | 25 |
| Thiourea | 50 |
| Isoascorbic acid | 100 |
| Antioxidant | 50 |

The above solid formulation which has a total weight of from about 775 to 865 milligrams when admixed with a liter of water provides an antiwilt solution which can be used directly for conditioning cut flowers.

When prepared as the solid formulation, the concentration of each of the ingredients can vary above and below the weights indicated above. For example, the ingredients of component A can preferably be present in an amount of from about 5 to about 300 milligrams; isoascorbic acid in an amount of from about 100 to about 2000 milligrams; tryptophane in an amount up to about 500 milligrams; thiourea in an amount of from about 50 to about 1000 milligrams; and the antioxidant in an amount of from about 10 to about 250 milligrams.

As hereinbefore indicated, optimum prolongation of the fresh appearance of cut flowers and other portions of plants has been obtained through the use of those antiwilt formulations which contain each of the three aforesaid components, that is, the inorganic salts, the organic reducing agent, and the antioxidant.

In addition to the ingredients, hereinbefore indicated for component A of the antiwilt formulation there may be added, if desired, other metal salts, such as, for example, ferric sulfide, ferrous sulfide, ferric chloride, ferrous chloride, ferric nitrate, ferrous nitrate, sodium molybdate, potassium molybdate, ammonium molybdate, and the like. With espect to components B and C, either a single compound from each of the aforementioned groups or a mixture of compounds may be employed in the antiwilt formulations.

Moreover, accessory factors such as other nutrients (sources for N, P, S, etc.), trace elements, soluble carbohydrates, pesticidal compounds, and the like, may be admixed with the formulation. Particularly in the case of roses which require a nitrogen supplement it may be desirable to add from about 250 to about 1000 milligrams of urea or a nitrate salt, such as potassium, sodium or calcium nitrate. These accessory factors, of course, have to be non-toxic to the cut flowers and must be chemically compatible with the other ingredients of the formulations.

Various other ingredients may be incorporated into the formulations of the instant invention, if so desired. For example, floral dyes are frequently employed to color white carnations and other flowers for special occasions and can be conveniently admixed with the antiwilt formulations. As indicated above, the only requirement being that any additives be compatible with other components of the formulation.

The desired conditioning of cut flowers achievable through the teachings of the persent invention has been demonstrated with a variety of plants and flowers which are members of the angiospermous class. Flowers representative of seed plants having a single cotyledon, i.e., the subclass monocotyledonous, and those having two cotyledons i.e., the subclass dicotyledonous, after conditioning with the formulation of this invention have maintained their freshly cut appearance for periods of time not heretofore possible.

In the following examples, the effect of the antiwilt formulations on the appearance of cut flowers representative of both the hardy and non-hardy varities was determined. For comparison purposes each of the three components of the formulations was employed separately, in conjunction with a second component, and finally as the most preferred three component formulation. Except as otherwise indicated, the components of the formulation were employed in the indicated concentrations. Components A and B were each employed in a concentration of 1 part by volume of the aqueous concentrate to 10 parts by volume of water. Component C was employed in such an amount as to provide the indicated parts per million in the formulation.

EXAMPLES 1–11

*Effect of separate components of formulation on wilting of carnations*

Freshly cut carnations were placed in containers and their stems immersed in separate aqueous solutions of each of the three components of the antiwilt formulation. The flowers were maintained at ambient temperatures, i.e., about 72° F., and their appearance observed daily. For comparison purposes and as controls, a portion of the carnations had their stems immersed in an equal amount of water which did not contain any of the components of the antiwilt formulation. The results of the test are tabulated below in Table I. It is evident from the data obtained that each of the separate components of the antiwilt formulation maintained the freshly cut appearance of the flower for a greater period of time than the control.

TABLE I.—EFFECT OF SEPARATE COMPONENTS OF FORMULATION ON WILTING OF CARNATIONS

| Example | Component | Days After Cutting | Percentage of Flowers | | |
|---|---|---|---|---|---|
| | | | Fresh | Incipient | Wilted |
| 1 | A [1] | 6 | 66 | 34 | 0 |
| 2 | Control | 6 | 0 | 0 | 100 |
| 3 | B [2] | 4 | 34 | 66 | 0 |
| 4 | B [2] | 6 | 0 | 0 | 100 |
| 5 | Control | 4 | 0 | 34 | 66 |
| 6 | do | 6 | 0 | 0 | 0 |
| 7 | C [3] | 6 | 34 | 0 | 66 |
| 8 | C [4] | 6 | 34 | 0 | 66 |
| 9 | C [5] | 6 | 0 | 34 | 66 |
| 10 | C [6] | 6 | 0 | 34 | 66 |
| 11 | Control | 6 | 0 | 0 | 100 |

[1] 1=10 aqueous solution.
[2] 1=10 aqueous solution.
[3] Vinyl 2-chloroethyl ether (100 parts per million aqueous solution).
[4] 2-Methyl-3-carbethoxy-5-hydroxybenzofuran (50 parts per million aqueous solution).
[5] 2,6-dimethoxyphenol (50 parts per million aqueous solution).
[6] 3,4-dimethylphenol (50 parts per million aqueous solution).

EXAMPLES 12–20

*Effect of separate components of formulation on wilting of iris*

Freshly cut iris were placed in containers and their stems immersed in separate aqueous solutions of each of the three components of the antiwilt formulation. The flowers were maintained at ambient temperatures, i.e., about 72° F., and their appearance observed daily. For comparison purposes and as a control, a portion of the iris had their stems immersed in an equal amount of water which did not contain any of the components of the antiwilt formulation. The results of the test are tabulated below in Table II. It is evident from the data obtained that each of the separate components of the antiwilt formulation maintained the freshly cut appearance of the flower for a greater period of time than the control.

TABLE II.—EFFECT OF SEPARATE COMPONENTS OF FORMULATION ON WILTING OF IRIS

| Example | Component | Days After Cutting | Percentage of Flowers | | |
|---|---|---|---|---|---|
| | | | Fresh | Incipient | Wilted |
| 12 | A [1] | 4 | 100 | 0 | 0 |
| 13 | Control | 4 | 0 | 0 | 0 |
| 14 | B [2] | 2 | 0 | 100 | 0 |
| 15 | Control | 2 | 0 | 0 | 100 |
| 16 | C [3] | 2 | 66 | 34 | 0 |
| 17 | C [4] | 2 | 0 | 66 | 34 |
| 18 | C [5] | 2 | 0 | 34 | 66 |
| 19 | C [6] | 2 | 34 | 0 | 66 |
| 20 | Control | 2 | 0 | 0 | 100 |

[1] 1=10 aqueous solution.
[2] 1=10 aqueous solution.
[3] Vinyl 2-chloroethyl ether (100 parts per million aqueous solution).
[4] 2-methyl-3-carbethoxy-5-hydroxybenzofuran (50 parts per million aqueous solution).
[5] 2,6-dimethoxyphenol (50 parts per million aqueous solution).
[6] 3,4-dimethylphenol (50 parts per million aqueous solution).

EXAMPLES 21–24

*Effect of two components of formulation on wilting of carnations*

Freshly cut carnations were placed in containers and their stems immersed in aqueous solutions of two of the three components of the antiwilt formulation. The flowers were maintained at ambient temperatures, i.e., about 72° F., and their appearance observed daily. For comparison purposes and as a control, a portion of the carnations had their stems immersed in an equal amount of water which did not contain any of the components of the antiwilt formulation. The results of the test are tabulated below in Table III. It is evident from the data obtained that the combined use of components A and B as well as B and C maintained the freshly cut appearance of the flowers for a greater period of time than either of the components alone.

TABLE III.—EFFECT OF TWO COMPONENTS OF FORMULATION ON WILTING OF CARNATIONS

| Example | Component [1] | Days After Cutting | Percentage of Flowers | | |
|---|---|---|---|---|---|
| | | | Fresh | Incipient | Wilted |
| 21 | A+B | 9 | 7 | 27 | 66 |
| 22 | Control | 9 | 0 | 0 | 100 |
| 23 | B+C [2] | 4 | 33 | 33 | 33 |
| 24 | Control | 4 | 0 | 34 | 66 |

[1] A and B each employed as a 1:10 aqueous solution.
[2] Vinyl 2-chloroethyl ether (100 parts per million aqueous solution).

EXAMPLES 25–30

*Effect of two components of formulation on wilting of iris*

Freshly cut iris were placed in containers and their stems immersed in aqueous solutions of two of the three components of the antiwilt formulation. The flowers were maintained at ambient temperatures, i.e., about 72°, F., and their appearance observed daily. For comparison purposes and as a control, a portion of the iris had their stems immersed in an equal amount of water which did not contain any of the components of the antiwilt formulation. The results of the test are tabulated below in table IV. It is evident from the data obtained that the combined use of components A and B as well as B and C maintained the freshly cut appearance of the flowers for a greater period of time than either of the components alone.

TABLE IV.—EFFECT OF TWO COMPONENTS OF FORMULATION ON WILTING OF IRIS

| Example | Component [1] | Days After Cutting | Percentage of Flowers | | |
|---|---|---|---|---|---|
| | | | Fresh | Incipient | Wilted |
| 25 | A+B | 4 | 13 | 47 | 40 |
| 26 | Control | 4 | 0 | 17 | 83 |
| 27 | B+C [2] | 2 | 66 | 34 | 0 |
| 28 | Control | 2 | 0 | 0 | 100 |
| 29 | B+C [3] | 2 | 0 | 100 | 0 |
| 30 | Control | 2 | 0 | 0 | 100 |

[1] A and B each employed as a 1:10 aqueous solution.
[2] Vinyl 2-chloroethyl ether (100 parts per million aqueous solution).
[3] 2-methyl-3-carbethoxy-5-hydroxybenzofuran (50 parts per million aqueous solution).

EXAMPLES 31–38

*Effects of three components of formulation on wilting of carnations*

Freshly cut carnations were placed in containers and their stems immersed in an aqueous solution containing all three components of the antiwilt formulation. The flowers were maintaind at ambient temperatures, i.e., about 72° F., and their appearance observed daily. For comparison purposes and as a control, a portion of the carnations had their stems immersed in an equal amount of water which did not contain any of the components of the antiwilt formulation. The results of the test are tabulated below in Table V. It is evident from the data obtained that the combined use of all three components maintained the freshly cut appearance of the flowers for a greater period of time than any of the components alone.

TABLE V.—EFFECT OF THREE COMPONENTS OF FORMULATION ON WILTING OF CARNATIONS

| Example | Component [1] | Days After Cutting | Percentage of Flowers | | |
|---|---|---|---|---|---|
| | | | Fresh | Incipient | Wilted |
| 31 | A+B+C [2] | 10 | 40 | 40 | 20 |
| 32 | A+B+C [3] | 10 | 39 | 43 | 18 |
| 33 | A+B+C [4] | 10 | 50 | 38 | 12 |
| 34 | A+B+C [5] | 10 | 0 | 100 | 0 |
| 35 | A+B+C [6] | 10 | 50 | 30 | 20 |
| 36 | Control | 4 | 34 | 66 | 0 |
| 37 | ___do___ | 6 | 0 | 0 | 100 |
| 38 | ___do___ | 10 | 0 | 0 | 100 |

[1] A and B each employed as a 1:10 aqueous solution. C present in the indicated amount.
[2] Vinyl 2-chloroethyl ether.
[3] 2-methyl-3-carbethoxy-5-hydroxybenzofuran (50 parts per million aqueous solution).
[4] 2,6-dimethoxyphenol (50 parts per million aqueous solution).
[5] 3,4-dimethylphenol (50 parts per million aqueous solution).
[6] 2,4-dichlorophenoxyisobutyric acid.

TABLE VI.—EFFECT OF THREE COMPONENTS OF FORMULATION ON WILTING OF IRIS

| Example | Component [1] | Days After Cutting | Percentage of Flowers | | |
|---|---|---|---|---|---|
| | | | Fresh | Incipient | Wilted |
| 39 | A+B+C [2] | 5 | 86 | 14 | 0 |
| 40 | A+B+C [3] | 5 | 0 | 61 | 39 |
| 41 | A+B+C [4] | 5 | 30 | 47 | 23 |
| 42 | A+B+C [5] | 5 | 53 | 27 | 20 |
| 43 | Control | 4 | 0 | 17 | 83 |
| 44 | ___do___ | 5 | 0 | 0 | 100 |

[1] A and B each employed as a 1:10 aqueous solution. C present in indicated amount.
[2] Vinyl 2-chloroethyl ether.
[3] 2-methyl-3-carbethoxy-5-hydroxybenzofuran (50 parts per million aqueous solution).
[4] 2,6-dimethoxyphenol (50 parts per million aqueous solution).
[5] 3,4-dimethylphenol (50 parts per million aqueous solution).

EXAMPLES 45–52

*Effect of formulation containing various benzofurans on wilting of carnations*

Freshly cut carnations were placed in containers and their stems immersed in aqueous solutions of the three component antiwilt formulation. The formulation contained components A and B as 1:10 aqueous solutions and components C, a benzofuran derivative, in the concentration indicated in Table VII. The flowers were maintained at ambient temperatures, i.e., about 72° F., and their appearance observed daily. For comparison purposes and as a control, a portion of the carnations had their stems immersed in an equal amount of water which did not contain any of the antiwilt formulation. The results of the test are tabulated below.

TABLE VII.—EFFECT OF THREE COMPONENT FORMULATION CONTAINING BENZOFURANS ON WILTING OF CARNATIONS

| Example | Benzofuran Compound | Amount in Formulation in Parts per Million | Days After Cutting | Percentage of Flowers | | |
|---|---|---|---|---|---|---|
| | | | | Fresh | Incipient | Wilted |
| 45 | 5-hydroxy-6-chloro-2-methyl-3-carbethoxy benzofuran. | 50 | 10 | 0 | 100 | 0 |
| 46 | 5-hydroxy-4-chloro-2-methyl-3-carbethoxy benzofuran. | 10 | 10 | 66 | 0 | 34 |
| 47 | 5-hydroxy-4,6-dichloro-2-methyl-3-carbethoxy benzofuran. | 50 | 10 | 34 | 0 | 66 |
| 48 | 5-hydroxy-6-bromo-2-methyl-3-carbethoxy benzofuran. | 10 | 10 | 66 | 34 | 0 |
| 49 | 5-methoxy-4-chloro-2-methyl-3-carbethoxy benzofuran. | 10 | 10 | 66 | 0 | 34 |
| 50 | N,N-dimethyl carbamate of 5-hydroxy-2-methyl-3-carbethoxy benzofuran. | 10 | 10 | 66 | 0 | 34 |
| 51 | Control | | 6 | 0 | 0 | 100 |
| 52 | ___do___ | | 10 | 0 | 0 | 100 |

EXAMPLES 39–44

*Effects of three components of formulation on wilting of iris*

Freshly cut iris were placed in containers and their stems immersed in aqueous solutions containing all three components of the antiwilt formulation. The flowers were maintained at ambient temperatures, i.e., about 70° F., and their appearance observed daily. For comparison purposes and as a control, a portion of the iris had their stems immersed in an equal amount of water which did not contain any of the components of the antiwilt formulation. The results of the test are tabulated below in Table VI. It is evident from the data obtained that the combined use of all three components maintained the freshly cut appearance of the flowers for a greater period of time than any of the components alone.

EXAMPLES 53–60

*Effect of formulation containing various benzofurans on wilting of iris*

Freshly cut iris were placed in containers and their stems immersed in aqueous solutions of the three components antiwilt formulation. The formulation contained components A and B as 1:10 aqueous solutions and component C, a benzofuran derivative, in the concentration indicated in Table VIII. The flowers were maintained at ambient temperatures, i.e., about 72° F., and their appearance observed daily. For comparison purposes and as a control, a portion of the iris had their stems immersed in an equal amount of water which did not contain any of the antiwilt formulation. The results of the test are tabulated below.

TABLE VIII.—EFFECT OF THREE COMPONENT FORMULATION CONTAINING BENZOFURANS ON WILTING OF IRIS

| Example | Benzofuran Compound | Amount in Formulation in Parts per Million | Days After Cutting | Percentage of Flowers | | |
|---|---|---|---|---|---|---|
| | | | | Fresh | Incipient | Wilted |
| 53 | 5-hydroxy-6-chloro-2-methyl-3-carbethoxy benzofuran. | 50 | 4 | 66 | 34 | 0 |
| 54 | 5-hydroxy-4-chloro-2-methyl-3-carbethoxy benzofuran. | 10 | 4 | 100 | 0 | 0 |
| 55 | 5-hydroxy-4,6-dichloro-2-methyl-3-carbethoxy benzofuran. | 50 | 4 | 100 | 0 | 0 |
| 56 | 5-hydroxy-6-bromo-2-methyl-3-carbethoxy benzofuran. | 10 | 4 | 0 | 100 | 0 |
| 57 | 5-methoxy-4-chloro-2-methyl-3-carbethoxy benzofuran. | 10 | 4 | 34 | 66 | 0 |
| 58 | N,N-dimethyl carbamate of 5-hydroxy-2-methyl-3-carbethoxy benzofuran. | 10 | 4 | 100 | 0 | 0 |
| 59 | Control | | 3 | 0 | 0 | 100 |
| Control | do | | 4 | 0 | 0 | 100 |

EXAMPLE 61

*Effect of antiwilt formulation on delaying of bud opening*

Iris were freshly cut while still in the tight bud stage and their stems immersed in aqueous solutions of the antiwilt formulation containing components A and B. The iris were maintained at ambient temperatures, i.e., about 72° F. and their appearance observed periodically. For comparison purposes and as a control, a portion of the iris had their stems immersed in an equal amount of water which did not contain any of the components of the antiwilt formulation. The results of the test are tabulated below in Table IX:

TABLE IX.—DELAYING OF BUD OPENING IN IRIS

| Hours After Cutting in Tight Bud Stage | Percentage of Iris Buds Open | |
|---|---|---|
| | In Water | In Antiwilt Formulation |
| 0 | 0 | 0 |
| 16 | 10 | 3 |
| 24 | 75 | 30 |
| 48 | 92 | 66 |
| 60 | 100 | 83 |
| 72 | 100 | 90 |

EXAMPLE 62

*Effect of antiwilt formulation on bud opening of flowers subjected to cold storage*

Freshly cut iris while still in the bud stage were placed in containers and their stems immersed in aqueous solutions of the antiwilt formulation. The flowers were stored at 38° F. for periods of up to 10 days. Thereafter, the flowers were maintained at 72° F. for 2 days. For comparison purposes and as a control, a portion of the iris had their stems immersed in water which did not contain any of the antiwilt formulation. The results of the test are tabulated below in Table X. It is evident from the data obtained that the use of the antiwilt formulation during cold storage resulted in a greater percentage of flower openings than those not treated with the formulation.

TABLE X.—COLD STORAGE-PROTECTIVE PROPERTY OF ANTI-WILT SOLUTIONS

| Formulation [1] | Percentage of Flowers Opening Storage Condition | |
|---|---|---|
| | 38° F. for 7 Days | 38° F. for 10 Days |
| | 72° F. for 2 Days | 72° F. for 2 Days |
| A+B | 100 | 80 |
| A+B+C [2] | 100 | 90 |
| A+B+C [3] | 100 | 50 |
| A+B+C [4] | 100 | 20 |
| Control | 0 | 12 |

[1] A and B each employed as 1:10 aqueous solution.
[2] Vinyl 2-chloroethyl ether (100 parts per million).
[3] 2-methyl-3-carbethoxy-5-hydroxy-benzofuran (50 parts per million).
[4] 3,4-dimethylphenol (50 parts per million).

Although the invention has been illustrated by the preceding examples, it is not to be construed as limited to the materials employed therein, but rather the invention encompasses the generic area as hereinbefore disclosed. Various modifications and embodiments of this invention can be made without departing from the spirit and scope thereof.

What is claimed is:

1. A solid formulation which is useful when dissolved in water for conditioning leaves, branches, flowers and other portions of plants which have been severed from their natural growing environment, said formulation comprising:
   (1) at least one component selected from the group consisting of:
      (A) the iodides and bromides of metals of the group consisting of sodium, potassium, and magnesium, and at least one member of the group consisting of boric acid and the water soluble inorganic salts and chelates of the divalent metal ions copper, zinc, manganese, magnesium, cobalt, and nickel, with the proviso that said component (A) contain at least one of the aforesaid metal ions and when one of said metal ions copper and zinc are present, at least one other of the aforesaid metal ion be present;
      (B) at least one organic reducing agent selected from the group consisting of ascorbic acid, isoascorbic acid, tryptophane, and thiourea, and
   (2) a water-soluble antioxidant.

2. The solid formulation of claim 1 wherein said antioxidant is characterized by the presence of a vinyloxy group.

3. The solid formulation of claim 1 wherein said antioxidant is vinyl 2-chloroethyl ether.

4. The solid formulation of claim 1 wherein said antioxidant is 2-methyl-3-carbethoxy-5-hydroxybenzofuran.

5. The solid formulation of claim 1 wherein said antioxidant is 2,6-dimethoxyphenol.

6. The solid formulation of claim 1 wherein said antioxidant is 3,4-dimethylphenol.

7. The solid formulation of claim 1 wherein said organic reducing agent is ascorbic acid.

8. The solid formulation of claim 1 wherein said organic reducing agent is isoascorbic acid.

9. The solid formulation of claim 1 wherein said organic reducing agent is a mixture of isoascorbic acid, tryptophane and thiourea.

10. A solid formulation which is useful when dissolved in water for conditioning leaves, branches, flowers and other portions of plants which have been severed from their natural growing environment, said formulation comprising:
(A) the iodides and bromides of metals of the group consisting of sodium, potassium, and magnesium, and at least one member of the group consisting of boric acid and the water soluble inorganic salts and chelates of the divalent metal ions copper, zinc, manganese, magnesium, cobalt, and nickel, with the proviso that said component (A) contain at least of the aforesaid metal ions and when one of said metal ions copper and zinc are present, at least one other of the aforesaid metal ion be present;
(B) isoascorbic acid, tryptophane and thiourea; and
(C) an antioxidant characterized by the presence of a vinyloxy group.

11. An aqueous formulation which is useful for conditioning leaves, branches, flowers and other portions of plants which have been severed from their natural growing environment, said formulation comprising:
(1) at least one component selected from the group consisting of:
(A) the iodides and bromides of metals of the group consisting of sodium, potassium, and magnesium, and at least one member of the group consisting of boric acid and the water soluble inorganic salts and chelates of the divalent metal ions copper, zinc, manganese, magnesium, cobalt, and nickel, with the proviso that said component (A) contain at least one of the aforesaid metal ions and when one of said metal ions copper and zinc, are present, at least one other of the aforesaid metal ion be present;
(B) at least one organic reducing agent selected from the group consisting of ascorbic acid, isoascorbic acid, tryptophane, and thiourea, and
(2) a water-soluble antioxidant.

12. The aqueous formulation of claim 11 wherein said anitoxidant is characterized by the presence of a vinyloxy group.

13. The aqueous formulation of claim 11 wherein said antioxidant is vinyl 2-chloroethyl ether.

14. The aqueous formulation of claim 11 wherein said antioxidant is 2-methyl-3-carbethoxy-5-hydroxybenzofuran.

15. The aqueous formulation of claim 11 wherein said antioxidant is 2,6-dimethoxyphenol.

16. The aqueous formulation of claim 11 wherein said antioxidant is 3,4-dimethylphenol.

17. An aqueous formulation which is useful for conditioning leaves, branches, flowers, and other portions of plants which have been severed from their natural growing environment, said formulation comprising from about 5 to about 300 parts per million, based on the total formulation, of each of copper sulfate, zinc sulfate, nickel sulfate, potassium iodide, potassium bromide, magnesium chloride and boric acid; up to about 500 parts per million of tryptophane; from about 50 to about 1000 parts per million of thiourea; from about 100 to about 2000 parts per million of isoascorbic acid; and from about 10 to about 250 parts per million of an antioxidant.

18. An aqueous formulation which is useful for conditioning leaves, branches flowers and other portions of plants which have been severed from their natural environment, said formulation comprising 50 parts per million, based on the total formulation, of each of copper sulfate, zinc sulfate, nickel sulfate, cobalt nitrate and boric acid; 20 parts per million of potassium iodide and potassium bromide; 300 parts per million of magnesium chloride; 15 parts per million of dl-tryptophane; 50 parts per million of thiourea; 100 parts per million of isoascorbic acid; and from about 10 to about 250 parts per million of an antioxidant.

19. A process for conditioning leaves, branches, flowers and other portions of plants which have been severed from their natural growing environment, which process comprises contacting the severed portion of said plant with an aqueous formulation comprising:
(1) at least one component selected from the group consisting of:
(A) the iodides and bromides of metals of the group consisting of sodium, potassium, and magnesium, and at least one member of the group consisting of boric acid and the water soluble inorganic salts and chelates of the divalent metal ions copper, zinc, manganese, magnesium, cobalt, and nickel, with the proviso that said component (A) contain at least one of the aforesaid metal ions and when one of said metal ions copper and zinc are present, at least one other of the aforesaid metal ion be present;
(B) at least one organic reducing agent selected from the group consisting of ascorbic acid, isoascorbic acid, tryptophane, and thiourea, and
(2) a water-soluble antioxidant.

20. A process for conditioning leaves, branches, flowers and other portions of plants which have been severed from their natural growing environment, which process comprises contacting the severed portion of said plant with an aqueous formulation comprising from about 5 to about 300 parts per million, based on the total formulation, of each of copper sulfate, zinc sulfate, nickel sulfate, potassium iodide, potassium bromide, magnesium chloride and boric acid; up to about 500 parts per million of tryptophane; from about 50 to about 1000 parts per million of thiourea; from about 100 to about 2000 parts per million of isoascorbic acid; and from about 10 to about 250 parts per million of an antioxidant.

References Cited by the Examiner

UNITED STATES PATENTS

| 2,567,929 | 9/1951 | Fessenden | 117—3 |
| 2,698,809 | 1/1955 | Fessenden | 117—3 |

FOREIGN PATENTS 227,306    9/1943    Switzerland.

LEWIS GOTTS, *Primary Examiner.*

JAMES O. THOMAS, JR., *Examiner.*

ALBERT J. ADAMCIK, *Assistant Examiner.*